(12) United States Patent
Vyavahare et al.

(10) Patent No.: US 11,940,867 B2
(45) Date of Patent: Mar. 26, 2024

(54) METHOD FOR MANAGING A PLURALITY OF EVENTS

(71) Applicant: GUAVUS INC., San Jose, CA (US)

(72) Inventors: Prasad Vyavahare, San Joe, CA (US); Swati Choksi, San Joe, CA (US); Silvia Veronese, San Jose, CA (US); Roger Brooks, San Jose, CA (US); Zainab Jamal, San Jose, CA (US)

(73) Assignee: GUAVUS Inc., San Jose, CA (US)

( * ) Notice: Subject to any disclaimer, the term of this patent is extended or adjusted under 35 U.S.C. 154(b) by 0 days.

(21) Appl. No.: 18/104,884

(22) Filed: Feb. 2, 2023

(65) Prior Publication Data

US 2023/0185650 A1  Jun. 15, 2023

Related U.S. Application Data

(63) Continuation-in-part of application No. 16/942,038, filed on Jul. 29, 2020, now Pat. No. 11,641,304.

(51) Int. Cl.
*G06F 11/07* (2006.01)
*G06F 11/30* (2006.01)
*G06F 11/32* (2006.01)

(52) U.S. Cl.
CPC ...... *G06F 11/0781* (2013.01); *G06F 11/3006* (2013.01); *G06F 11/327* (2013.01)

(58) Field of Classification Search
CPC .......... G06N 20/00; G06F 17/16; G06F 17/18
See application file for complete search history.

(56) References Cited

U.S. PATENT DOCUMENTS

| 2007/0140133 A1 | 6/2007 | Gudipalley |
| 2013/0097125 A1 | 4/2013 | Marvasti et al. |
| 2017/0118092 A1 | 4/2017 | Dixon et al. |
| 2019/0325314 A1 | 10/2019 | Bourges-Sevenier et al. |
| 2020/0134421 A1 | 4/2020 | Suthar |
| 2021/0117857 A1* | 4/2021 | Sriharsha ............ G06F 18/2185 |

OTHER PUBLICATIONS

International Preliminary Report on Patentability dated Jan. 31, 2023 for corresponding International Application PCT/US2021/042142 (8 pages).
International Search Report dated Oct. 26, 2021 for corresponding International Application PCT/US2021/042142 (3 pages).

* cited by examiner

*Primary Examiner* — Oleg Survillo
*Assistant Examiner* — Christopher P Cadorna

(57) ABSTRACT

Event management system and method. Events comprise physical and logical attributes. Tuples are created to identify a set of logical attributes. The tuples are arranged in hierarchized relations by creating binarized co-occurrence matrices, each co-occurrence matrix reflecting different time intervals and indicate occurrence of tuples in time windows of the time intervals. Tuple pairs are analyzed to determine probabilistic score related to co-occurrence, and tuple families are created from tuple pairs based on the probabilistic score. From tuple families, events are used to extract tuple instances including physical attributes, which are arranged as tuple-instance families using the corresponding tuple families as reference.

14 Claims, 10 Drawing Sheets

| 601a | tuple1 | tuple2 | tuple3 | tuple4 | tuple5 | tuplen |
|---|---|---|---|---|---|---|
| T_bin = 0, 1 | 0 | 1 | 1 | 0 | 0 | 1 |
| T_bin = 1, 2 | 1 | 0 | 0 | 1 | 1 | 0 |
| T_bin = 2, 3 | 1 | 1 | 0 | 0 | 0 | 0 |
| T_bin = n-1, n | 1 | 1 | 1 | 1 | 1 | 1 |

Time interval = 1 second

METHOD FOR MANAGING A PLURALITY OF EVENTS

CROSS-REFERENCE TO RELATED APPLICATIONS

The present application is a continuation-in-part application of U.S. patent application Ser. No. 16/942,038, filed on Jul. 29, 2020, the entire disclosure of which is incorporated herein by reference.

TECHNICAL FIELD

This invention belongs to the field of Network Operations Control (NOC) and network events management.

STATE OF THE ART

Network Operations Control teams are usually flooded with thousands of network events at any given time. Depending on the network size, this amount may be in the order of hundreds of thousand daily, which is an overwhelming volume.

At this rate, manual analysis and prioritization of events become an extensive and time-consuming task. There exist solutions to manage events and classify them according to their severity. However, even in those solutions, in which approximately 10-20% of events are listed as critical, the number of events is still far too large to allow a network operations control team to address all critical events adequately and in a timely manner.

It is, therefore, a problem for network operators to choose which events may be ignored or deprioritized and which ones need high-priority attention by network operators.

Because networks are made up of interconnected components, problems in one component have the potential to propagate to other parts of the network. The more time it takes to identify and correct a problem in the network that may generate other problems, the greater the impact. For example, if an alarm is a smoke alarm indicating a potential fire, if that fire is left unaddressed, a server near the alarm may go down or even an entire cluster. Thus, early identification of the smoke alarm as being a high-priority event may avert other conditions that may lead to other alarms, e.g., alarms indicative of one or more servers or an entire data center going down.

Manually crafted rules may be useful in some cases, but they depend on the network topology. If the topology changes, rules that reflect the earlier topology need to be updated or replaced to reflect the new topology.

It is, therefore, desirable to have an automated method and system that identifies high-priority events to network operators, the resolution of which, if addressed in a timely fashion, prevents the occurrence of related events that may flow from such high-priority events. The automated method and system should be independent of the network topology or on specific network configurations that may vary over time.

SUMMARY

A technology is described herein that provides an automated method and system for providing network operators with identification of high-priority events, the resolution of which, if addressed in a timely fashion, prevents occurrence of related events that may flow from such high-priority events. The automated method and system do not depend on the network topology or on specific network configurations that may vary over time.

In an aspect, the presented technology manages a plurality of events, wherein each event comprises physical attributes and logical attributes, by creating tuples, each tuple being an identifier for a set of logical attributes to events having all the same logical attributes. The tuples are arranged in hierarchized relations between tuples, wherein combinations of two tuples form a pair of tuples in which parent-child relations are provided between tuples, by creating a plurality of binarized co-occurrence matrices, each co-occurrence matrix reflecting different time intervals, wherein each column corresponds with a tuple and each row corresponds with a time window, so each matrix entry at a tuple column and a time-window row represents that at least one event corresponding to the tuple associated with the tuple column appears in each time window associated with the time window row. A heuristic function is applied to each matrix entry of said plurality of co-occurrence matrices to obtain a co-occurrence probabilistic score for each pair of tuples, wherein the probabilistic score indicates the probability that one tuple of the pair, referred to as child tuple, co-occurs with the other tuple of the pair, referred to as parent tuple, and using the probabilistic score of each pair of tuples to quantify the strength of the parent-child relations. The tuples are thus arranged in families, each family contains all the tuples related according to the parent-child relation. The parent tuple of each family, defined as a tuple that has at least one child and has no parent is identified. Instance tuples associated with each tuple in each tuple family are extracted thereby creating instance families and the parent tuple instances of each instance family are presented together with the physical attributes of the events associated to each parent instance tuple each instance family.

In an aspect, the technology further divides the events into at least two samples, wherein creation of the plurality of binarized co-occurrence matrices, for each of the at least two samples, each column corresponds to a tuple and each row corresponds to a time window, such that each matrix entry thereby corresponds to a tuple and a time window and indicates that at least one event of said each sample has the logical attributes corresponding to the tuple appears in the time window associated with the matrix entry. Further, the presented technology applies the heuristic function to obtain a co-occurrence probabilistic score for each pair of tuples, wherein the probabilistic score is a function of the probability that one tuple of the pair, referred to as child tuple, co-occurs in the binarized co-occurrence matrix with the other tuple of the pair, referred to as parent tuple, and identifies common parent-child relations in the two samples, and using the identified common parent-child relations provides a unified set of parent-child relations between tuples based on both at least two samples.

In an aspect, prior to the step of dividing the events into two samples, the presented technology cleans the tuples by deleting tuples that do not fulfill a plurality of minimum requirements.

In an aspect, the presented technology for each binarized co-occurrence matrix creates a graph of parent-child relations based on the results of the heuristic function, and calculates a probability for each parent-child relation and marking as strong those parent-child relations that have a probability higher than a predetermined threshold.

In an aspect, the presented technology chooses a co-occurrence matrix based on having higher probabilistic scores for parent-child relations vis-à-vis other co-occurrence matrices and uses the parent-child relations generated from an optimal co-occurrence matrix to provide the unified set of parent-child relations, wherein the optimal co-occurrence matrix is the co-occurrence matrix with the highest probabilistic scores. In an aspect, presenting the parent tuples includes presenting instances associated to each parent tuple. In another aspect, presenting the parent tuples includes conferring a severity index to each parent tuple of each family, so that the final list of parent tuples is hierarchized.

In an aspect, the presented technology is implemented as a pipeline of modules.

In an aspect, the presented technology is implemented on a network operator console.

BRIEF DESCRIPTION OF THE DRAWINGS

To complete the description and to provide for a better understanding of the invention, a set of drawings is provided. These drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
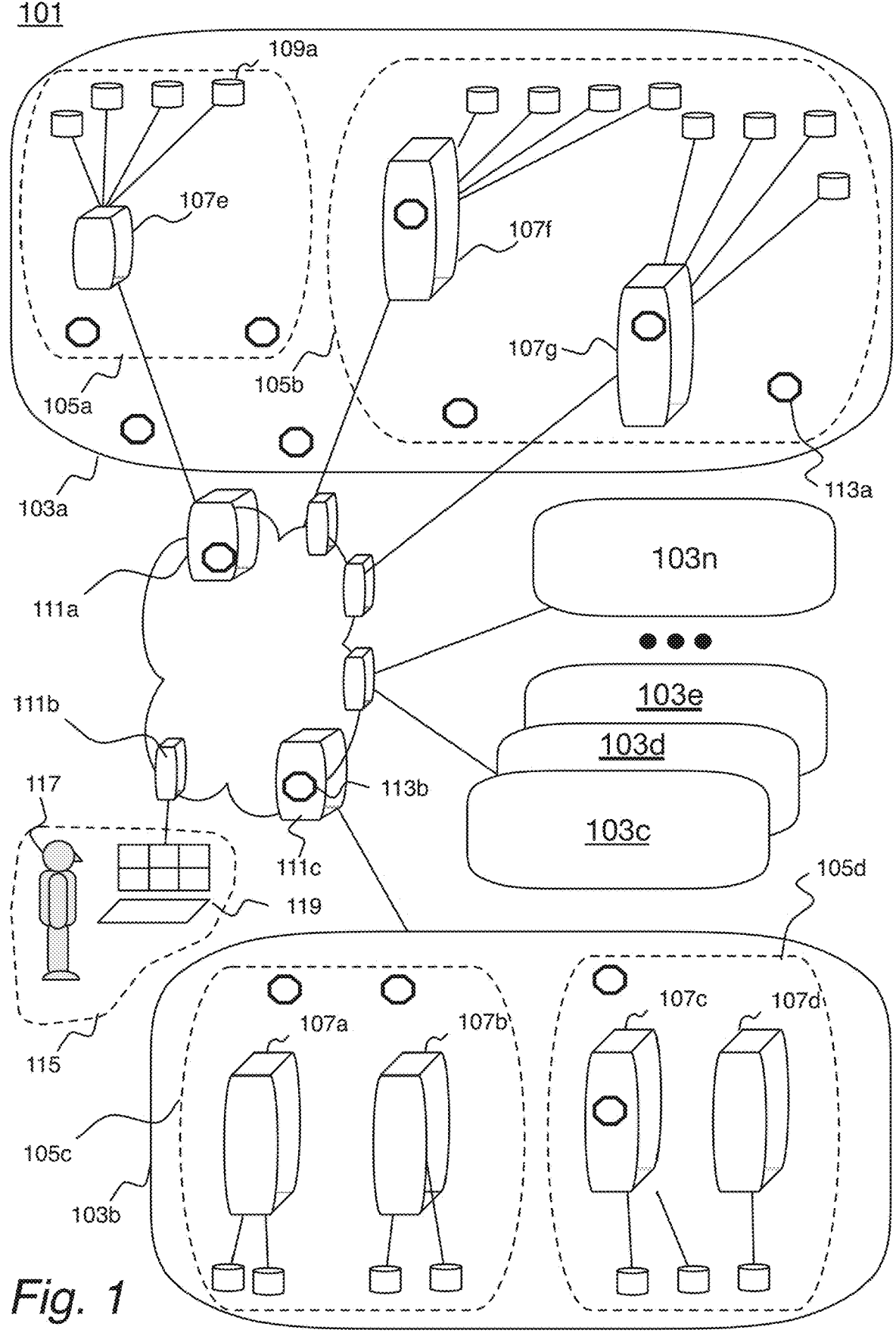
FIG. 1 is an illustration of an exemplary computer network with several interconnected data centers each having one or more clusters, servers, and alarms.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate. For elements of a similar nature, a letter index is used, wherein the letter x is used to refer to any such element, e.g., data centers are numbered 103, specific instances are 103a, 103b, etc., and 103x indicates reference to any of 103a, 103b, etc.

The present technology provides for an efficient mechanism for allowing a network operator to effectively manage the near intractable problem of addressing critical events that occur in computer networks such that events that may foretell the occurrence of other events can be addressed thereby avoiding such subsequent events that may have dire consequences on network operations.

FIG. 1 is an example topology of a network 101 connecting multiple data centers 103x, each with multiple clusters 105x (indicated by dashed lines), and each cluster having multiple servers 107x, each of which may include several hardware or software resources 109 (these are not individually tagged with a reference numeral but are depicted using the same icon as resource 109a. The resources 109x may be cloud computing services, databases, e-commerce sites, etc. The network 101 may further include multiple gateway computers 111a, 111b, etc., which provide connectivity between the various nodes that make up the network.

Various hardware and software sensors 113 monitor the performance of the network operations. These sensors (for the sake of clarity of the figure, only a few of the sensors have been given reference numerals; however, like-shaped octagonal elements are all intended to indicate examples of sensors) may be located in any of many locations, e.g., at data centers, at a cluster level, at servers, at gateways. Any given sensor may have associated conditions that trigger alarms, which are a form of events.

Figure 2:
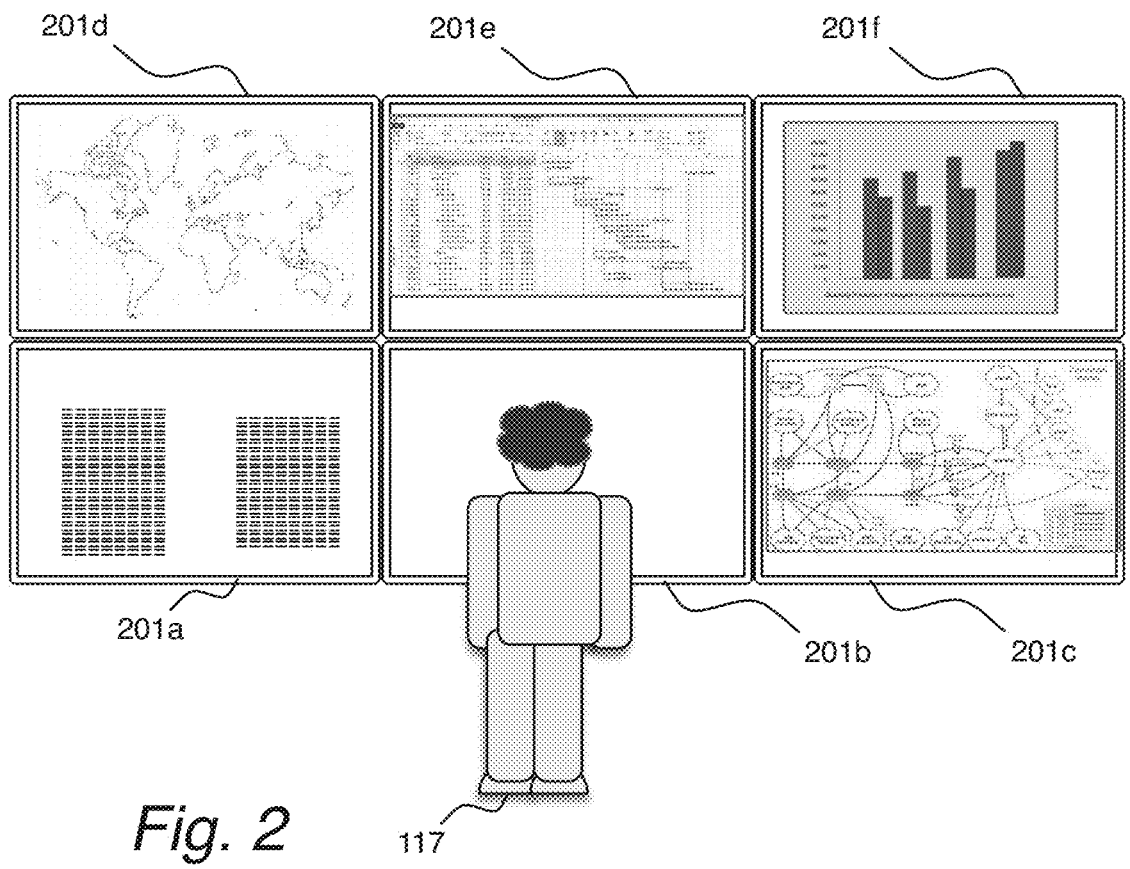
FIG. 2 is an illustration of a network operator console.

A network operations center 115 is a centralized location in charge of administering the operations of the network 101. A network center operator 117 operates a network operations console 119, illustrated in FIG. 2.

A network operations console 119 may consist of many displays 201x showing different aspects of the operations of the network 101. One such display 201a may list events occurring on the network 101. As a network 101 may consist of many data centers 103 each having many clusters 105 and servers 107 and other components, the number of events that can occur may be over whelming A network operator 117 may be made aware of sensor values and alarms that occur simultaneously at multiple data centers. The number of events in 24-hour period may be in the tens of thousands or even higher.

It is therefore desirable to provide a mechanism that can raise the awareness of a network operator 117 of particular events that may foretell dire consequences to the network operations so that handling of such events may be prioritized over events that have minor impact of that are unlikely to snowball into larger events.

As an example, a smoke alarm, which may indicate a fire or a serious malfunction of a piece of equipment causing the release of smoke, may lead to a data link going down, which may in turn lead to a server being inaccessible.

It is therefore a goal of the present technology to find events that are the root issue that are likely to lead to or that foretell other issues. This task is referred to as root issue analysis.

The present technology takes as input a dataset of events produced by sensors in a network. The sensors may be hardware or software sensors.

The invention provides a method for managing a plurality of events, wherein each event comprises physical attributes and logical attributes. A logical attribute is an attribute that describes the nature of the event, and a physical attribute is an attribute that describes the physical location where the event has occurred. A simplified event maybe:

Data Center=San Francisco A, Device ID=Alarm #1, AlarmType=Smoke, Status=Active.

For that simplified alarm, the logical attribute is that it is a smoke alarm. Obviously, smoke alarms may exist at all data centers and there may be multiple smoke alarms at any given data center. Thus, the "AlarmType" attribute does not define where the alarm occurs but the nature of the alarm, i.e., it is a logical attribute. Conversely, "Data Center=San Francisco A" defines that the location of the alarm is at data center A located in San Francisco. Similarly, "DeviceID=Alarm #1" defines the precise smoke alarm instance that has been triggered. Therefore, "Data Center" and "DeviceID" are physical attributes.

Alarms can relate to a myriad of different types of situations that may occur. Examples include hardware alarms such as:
  smoke alarms
  fire alarms
  intrusion alarms
  equipment failure alarms
  power failure
and operational alarms such as:
  communications failure
  communications collision
  storage overflow
  storage corruption An event, while in a general sense is an occurrence of an identifiable condition, in the context of network operations, an event is an incident identified by an operations circumstance such as the triggering of an alarm, e.g., a hardware alarm such as a smoke alarm or an equipment alarm indicating that a piece of equipment is malfunctioning, or an operational alarm such as overloading of a piece of equipment.

As described hereinbelow, logical attributes and sets of related logical attributes may be identified by a structure referred to herein as a tuple. A tuple is an identifier that represents a logical attribute or a set of logical attributes. A tuple provides some information about an alarm or an event in an input data set.

However, actual events are also identified by physical attributes, such as alarm identifiers, data center location, link identifier. A representation of such physical attributes or a set of related physical attributes is referred to as an instance tuple. In other words, an instance tuple is an identifier that represents a physical attribute or a set of physical attributes. An instance tuple, thus, is an instance of physical attributes that correspond to particular logical attributes associated with an event.

Figure 3:
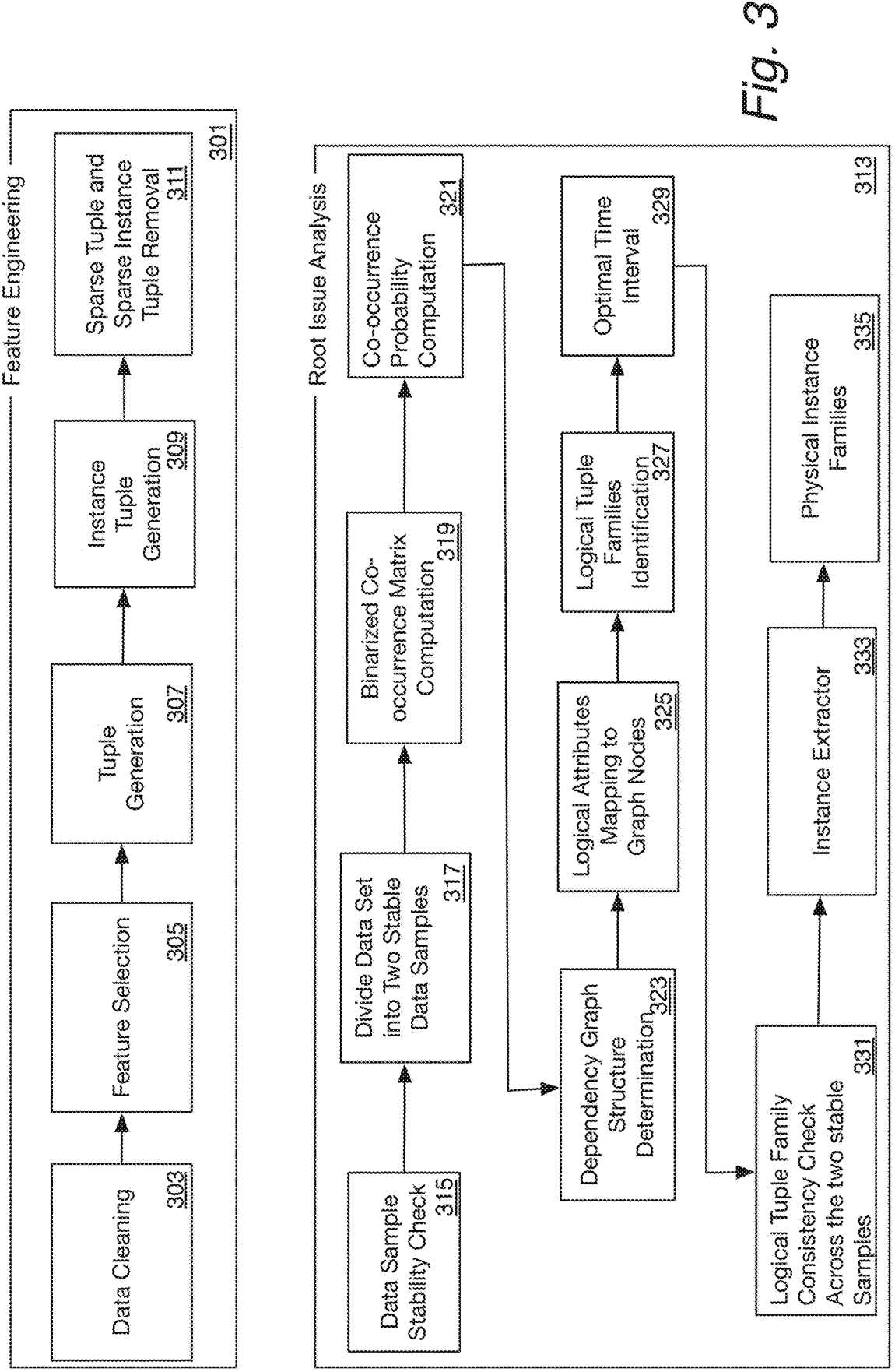
FIG. 3 is a flow diagram illustrating a method, which may be implemented as a pipeline of distinct modules, for determining root issues.

FIG. 3 is a flow diagram illustrating a method, which may be implemented as a pipeline of distinct modules, for determining root issues.

As a preliminary step, a data set including samples obtained from the various sensors and alarms 113 in the network is analyzed. A feature engineering process 301 includes a first step of data cleaning, step 303, which accepts the data set as input. In the data cleaning step, data quality checks are performed, redundant records removed, and null records identified and removed.

Next, logical attributes are selected, step 305, and grouped and tagged with identifiers to form tuples, step 307.

With the identification of tuples, data samples in the data set that contain the logical attributes defined by a tuple are identified and marked as instance tuples, step 309.

Sparse tuples and sparse instance tuples, i.e., tuples and instance tuples with few associated events are removed, step 311.

Figures 4, 5:
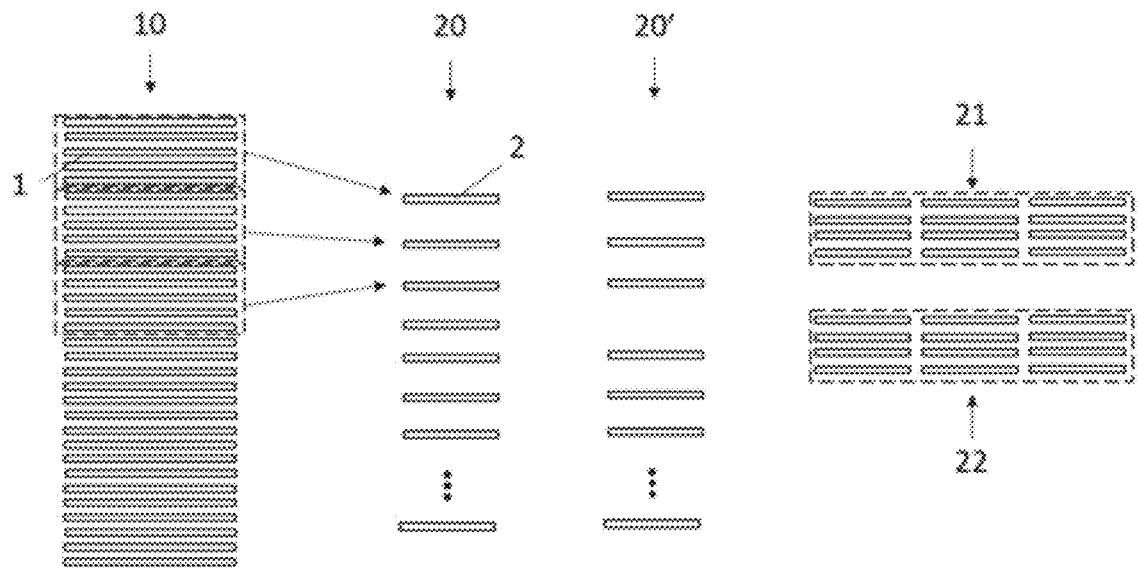
FIG. 4 is an illustration of creation of two stable samples from a data set of events in the feature engineering process of the method of FIG. 3.
FIG. 5 is an illustration of an example having five events of a data set and some logical attributes of those events.

FIG. 4 is an illustration of creation of two stable samples from a data set of events in the feature engineering process of the method of FIG. 3. From the original event dataset 10 and based on the logical attributes of each event 1, tuples 2 are defined, in such a way that each tuple 2 is defined by logical attributes that multiple events have in common. In other words, any events 1 with the same logical attributes cause the grouping of that set of logical attributes into one tuple.

Consider FIG. 5, which is an illustration of an example having five events (1*a*-1*e*) of a data set 10*a* and some logical attributes of those events. Each of the events 1*a*-1*e* have a number of logical attributes, which in FIG. 5 are denoted by the letters A-H. For example, logical attribute A maybe "smoke alarm active" and attribute E maybe "datalink down" and so forth. Of course, the events also have physical attributes, but those are not used to define tuples; rather, they define instance tuples.

As can be seen in FIG. 5, events 1*a*, 1*b*, and 1*c* all have the logical attributes A and C; event 1*a* also has the logical attributes B and D that event 1*b* does not have. Therefore, the set of logical attributes A and C maybe used to form a tuple AC. Conversely, both event 1*a* and 1*d* share the logical attributes A, B, C, and D. These can therefore be used to form the tuple ABCD. At the extreme, logical attribute B is the only logical attribute of event 1*e*. It is also a logical attribute of events 1*a* and 1*c*. Thus, a tuple B may be formed corresponding to the logical attribute B.

Thus, the original event dataset 10 has been used to create a tuples dataset 20. Each tuple is identified by a tupleID as discussed hereinabove.

Afterwards, the tuples dataset 20 is cleaned, obtaining a clean tuples dataset 20' by deleting those tuples which do not fulfill a plurality of minimum requirements, step 311. These requirements may be related to sparsity, redundancy, null events or any other requirement imposed by the user.

The resulting tuples dataset 20' is then input into the Root Issue Analysis pipeline 313.

As noted, a network continuously produces events, often at a very high rate. However, the set of tuples that are useful for determining tuples tends to stabilize and not change significantly when a large number of events have been fed into the feature engineering pipeline 301. Thus, it is not required to analyze the full data set available for the purpose of forming tuples. Thus, a data-sample stability check is performed, step 315. A stable data sample is a data sample that is a subset of the input data set, wherein the subset, the stable data sample, has a stable occurrence of tuples, instance tuples, and associated logical attributes required to execute the Root Issue Analysis pipeline. Stable occurrence of tuples in this context means that adding additional events has no or minimal impact on the tuples that result from the dataset. In other words, additional alarms do not change the set of tuples that result from analysis of the data set. At that point, there is no advantage of further analyzing the received data from a training perspective.

The clean tuples dataset 20' is then divided into two stable data samples 21, 22 (FIG. 4), step 317. These two stable data samples 21, 22 have substantially the same number of tuples.

Figures 6, 7:
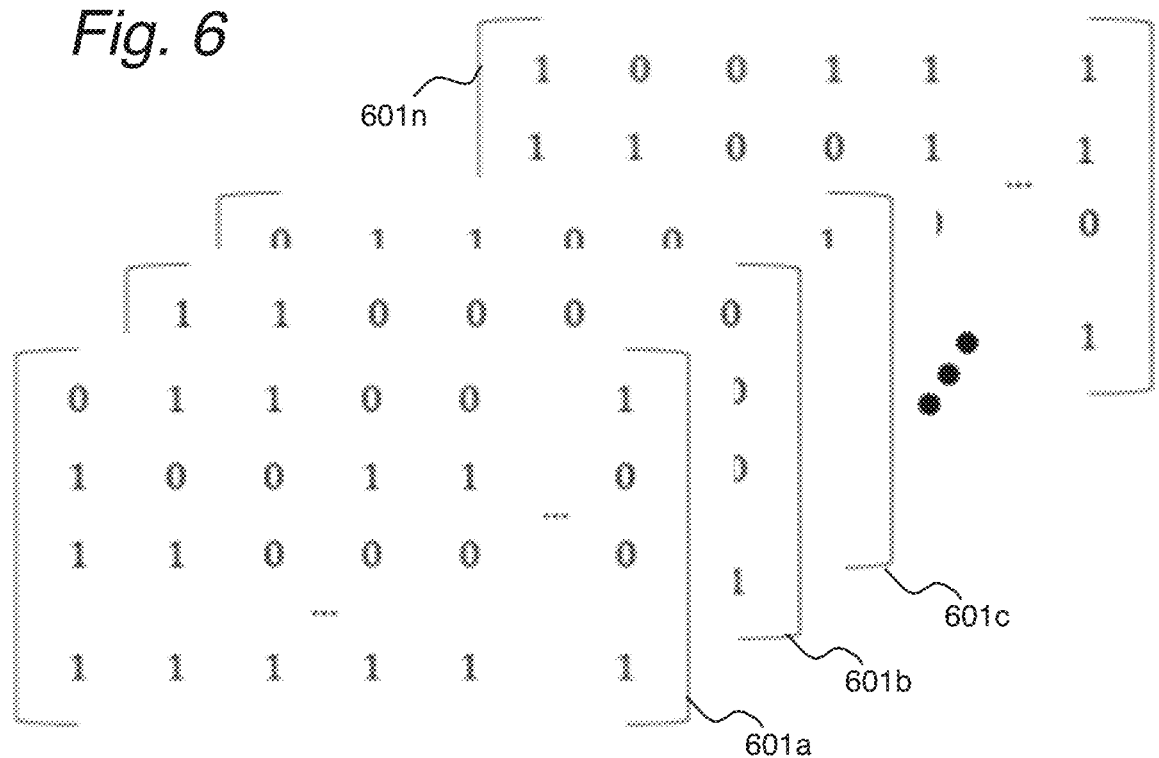
FIGS. 6 and 7 illustrate binarized co-occurrence matrices that are used by the method of FIG. 3 to determine relationships between logical tuples.

Next, a set of binarized co-occurrence matrices is computed, step 319, wherein each co-occurrence matrix corresponds to a particular time interval. FIG. 6 illustrates one co-occurrence matrix 601*a* having a first time interval (e.g., 1 second), another 601*b* having a second time interval (e.g., 2 seconds), another 601*c* with a third time interval (e.g., 10 seconds), etc.

For each binarized co-occurrence matrix, time is divided into different time windows each having the same time interval. Hence, one binarized co-occurrence matrix 601*a*, illustrated in FIG. 7, is, for example, created with time intervals of 1 second, then another binarized co-occurrence matrix is created with time intervals of 2 seconds, and so on. For each binarized co-occurrence matrix, each column correspond with a tuple and each row corresponds with a time window, so each matrix entry represents that at least one event corresponding to the tuple appears in the corresponding time window. For example, the "1" at matrix element at the row for T_bin=2,3 and the column for tuple2 indicates that at least one event with the logical attributes associated with tuple2 occurred between 2 seconds and 3 seconds on the chronological timeline beginning with time=0 (the first row) and ending with time=n (the last row). Conversely, the "0" at T_bin=1,2 and tuple3 indicates that there were no events corresponding to the logical attributes associated with tuple3 during the time window between second=2 and second=3.

For each stable sample 21, 22, there is a plurality of binarized co-occurrence matrixes 601, each one reflecting the time succession of the different tuples when time is divided according to different time intervals.

For the first stable sample 21, there is, for example, twenty binarized co-occurrence matrixes, wherein each binarized co-occurrence matrix represents a different time interval, and there is also twenty binarized co-occurrence matrixes for the second stable sample 22, wherein each binarized co-occurrence matrix associated with the second sample 22 represents a different time interval but has a corresponding time interval to one binarized co-occurrence matrix of the set of binarized co-occurrence matrices associated with the first stable sample 21.

From the co-occurrence matrices, for each co-occurrence matrix a heuristic function is applied for all possible tuple pairs across all time windows of the binarized matrix and a tuple pair with most optimal co-occurrence probabilistic score is chosen using a greedy algorithm approach, step 321. The heuristic function may be a probabilistic score based on co-occurrences of the tuple pair and temporal probabilities for each tuple, which may, for example, be added or given weighted averages. Co-occurrence probability is the probability that both tuples of a tuple pair co-occurs in the same time windows of a binarized co-occurrence matrix. Consider, for example, the tuple pair tuple1 and tuple3 of co-occurrence matrix 601*a* of FIG. 7. Not considering the hidden rows indicated by the ellipsis, tuple1 and tuple2 only co-occur in the last row out of four rows. Thus, the co-occurrence probability (in four illustrated rows), is 0.25. Temporal probability is the probability that a tuple occurs in a the time window of a binarized co-occurrence matrix. For example, tuple1 is present in three out of four rows and, therefore, has a temporal probability of 0.75. Conversely, tuple3 is present in two out of four rows and, therefore, has a temporal probability of 0.5. These values can be combined to provide a probabilistic score.

From the application of the heuristic function for all tuple pairs, over all time windows of binarized co-occurrence matrices, a probabilistic score is obtained for each tuple pair. These values are used as input to a greedy algorithm to determine better paths between tuple pairs. An initial probabilistic score, may, for example, indicate that there is a very low co-occurrence between two tuples. Again, consider the co-occurrence matrix 601*a*, in particular, tuples 3 and 4. These two tuples only have co-occurrence in the final timeslot and both tuples have only temporal probabilities of 0.50. Thus, the heuristic function would return a relatively low probabilistic score for this tuple pair, which may be taken that there is a low relationship between events corresponding to tuple3 and tuple4. However, considering intermediary tuples, such as tuples 1, 2, and 5, it is possible that there is an underlying relationship between tuples 3 and 4 that involves one of those other tuples. Greedy algorithms are described in, for example, Cormen, Thomas H.; Leiserson, Charles E.; Rivest, Ronald L.; Stein, Clifford (2001). "16 Greedy Algorithms" Introduction To Algorithms *MIT Press*. pp. 370-. ISBN 978-0-262-03293-3. The co-occurrence probabilistic score reflects the probability that one tuple of the pair co-occurs with the other tuple of the pair.

The determination of probabilistic score may reveal that certain tuple pairs have a very low probabilistic score from both the heuristic function and the application of a greedy algorithm. Such tuple pairs are labeled as weak relationships. During a consolidation step, in which analysis from both stable samples are consolidated, step 331 (see discussion hereinbelow), the weak-relationship tuple pairs may be searched for in the analysis of the other stable sample. If both stable samples show the tuple pair as having a relationship, albeit weak, the final output of consistent stable families may include the tuple pair, or a tuple family including the tuple pair with the label as a weak relationship. Such labels are used in prioritizing (or deprioritizing) tuple families for monitoring.

Furthermore, some tuples may not belong to any tuple pairs with a high enough probabilistic score to merit inclusion in further analysis. The setting of such a threshold would depend on circumstances, e.g., it could be set as a function of the maximum observed probabilistic score or tuple pairs may be ranked by probabilistic score and only the tuple pairs with a probabilistic score placing them in the top x % (e.g, top 50%) are considered further.

Figure 8:
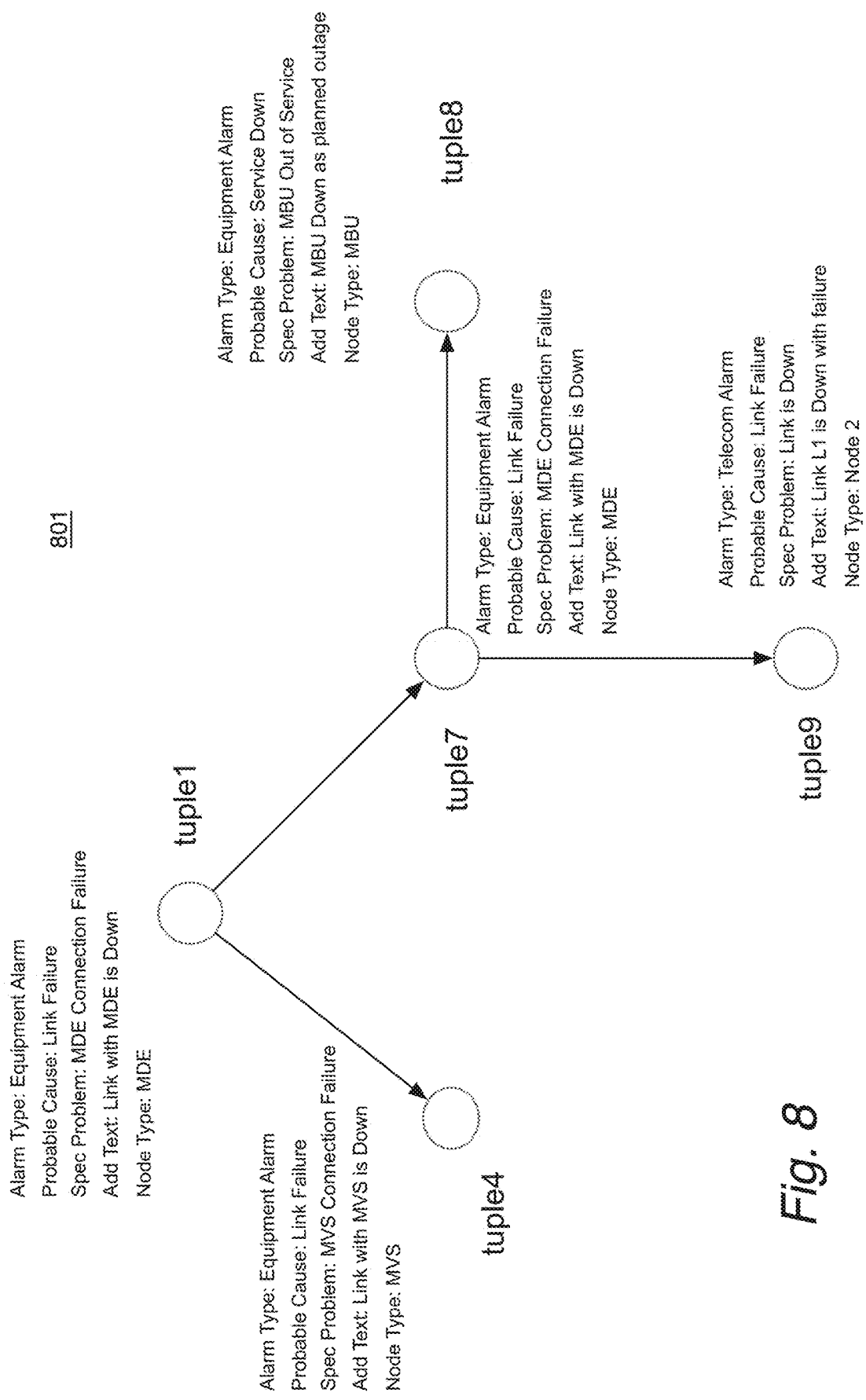
FIG. 8 is a schematic illustrating an example of a tuples family, wherein five tuples are hierarchically organized according to the parent-child relations obtained during the method of FIG. 3.

For each of the binarized co-occurrence matrixes of each of the stable samples 21,22, a dependency graph structure is generated, step 323. FIG. 8 is a schematic illustrating an example of a tuples family, wherein five tuples are hierarchically organized according to the parent-child relations obtained in the previous steps.

Figure 9:
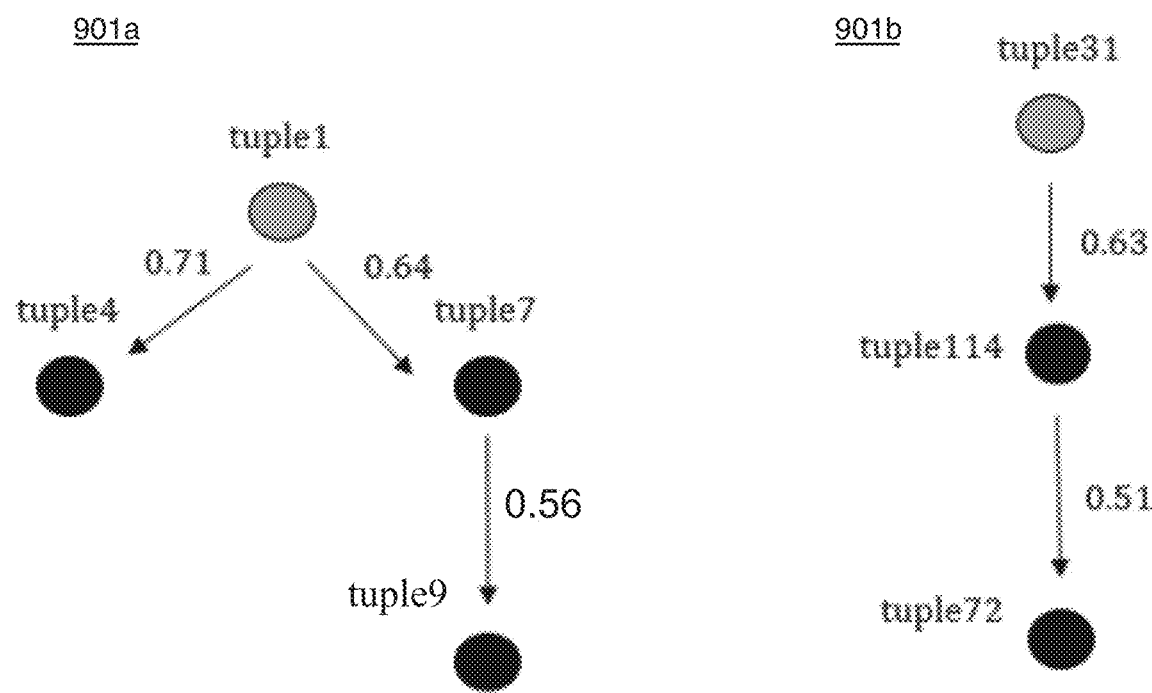
FIG. 9 is an illustration of two tuple families each associated with a graph in which arc strengths have been computed.

FIG. 9 is an illustration of two tuple families each associated with a graph 901*x* in which arc strengths have been computed. FIG. 9 illustrates two graphs of parent-child relations as a result of application of a heuristic function, where pairs of tuples with a probabilistic score higher than 0.4, which may have been considered a threshold for further consideration, are shown according to their preliminary parent-child relation. Consider the arc from tuple 1 to tuple 7, it has a probabilistic score of 0.64, which is an indication that an event with the logical attributes associated with tuple 7 have a 0.64 probability of co-occurring with an event with the logical attributes associated with tuple 1. Conversely, the probabilistic score of 0.71 is associated with the arc from tuple 1 to tuple 4.

In selecting optimal time windows for root issue analysis, the technology described herein uses these probabilistic scores and compares their relative strength. An arc is considered stronger when it has a higher probabilistic score than another arc. Similarly, a tuple family is considered stronger than another tuple family when the combined probabilistic score is higher than the combined probabilistic score of the other tuple family.

Step 323 generates graphs like the ones of FIG. 9 for each of the binarized co-occurrence matrixes 601x for each the two stable samples 21, 22.

Next, logical attributes are mapped to each arc within a graph, such as graphs 901a and 901b, step 325. Such mapping facilitates analysis of relationships between parent and child nodes within a graph.

Next, a top-down traversal across the graph arcs is performed to identify arcs or set of arcs within one graph and assigns a unique identifier to each graph 901x, step 327. Each graph 901x with a unique identifier is labeled as "Event Family id" in which the parent node is the root issue node. For example, in graph 901a, tuple 1 is the root issue node.

Provided these results, an optimal co-occurrence matrix and corresponding optimal time window is chosen for each stable sample 21, 22, step 329. The optimal co-occurrence matrix is that binarized co-occurrence matrix which provides parent-child relation with the highest combined probabilistic scores. So, the optimal co-occurrence matrix has the largest number of arcs with high probabilistic scores. In other words, for each of the stable samples 21 and 22, the combined probabilistic score for all the graphs 901x of each binarized co-occurrence matrix 601x is computed by traversing the graphs 901x and computing a mean probabilistic score of the arcs that connect the various tuples that are present in those graphs 901x, respectively. For each of the stable samples 21 and 22, the binarized co-occurrence matrix 601x with the highest combined probabilistic score is considered the optimal co-occurrence matrix. Thus, each stable sample has associated therewith an optimal co-occurrence matrix. The time intervals associated with those co-occurrence matrices are not necessarily the same.

The parent-child relations provided by the optimal co-occurrence matrix are used to provide a set of hierarchized relations between tuples. The time interval of this optimal co-occurrence matrix is called optimal time interval. For example, it may be that the co-occurrence matrix which was created using time intervals of 6 second is the optimal co-occurrence matrix for one of the stable samples if that time interval produces the optimal parent-child relations. In this case, the optimal time interval would be 6 seconds. The other stable sample may have the same optimal time interval or another optimal time interval.

Hence, each stable sample yields an associated set of hierarchized relations between tuples. Each group of tuples related by the parent-child relations is called a tuples family Hence, each stable sample yields a set of tuples families.

Next, a consistency check is performed between the identified tuples families in the respective tuples families associated with each of the stable samples, step 331. The common parent-child relations which are identical in the two samples are identified and used to provide the final set of tuples families.

The steps described above deal with logical attributes associated with tuples. However, the events of the original data set 10 are defined by both logical attributes and physical attributes. Consider the following simplified set of logical and physical attributes:

Logical Attributes
    data center fire alarm
    data link down
    server nonreachable
Physical Attributes
    San Jose D.C. #34
    SF d.c. #12
    Link ID LID22
    Link ID LID45
    Server ID66

These can result in a logical tuple family as follows:
data center fire alarm→
    data link down→
        server non-reachable
And the corresponding instance families
San Jose D.C. #34 (data center fire alarm)→
    Link ID LID22 (data link down)→
        Server ID66 (server non-reachable)
SF d.c. #12 (data center fire alarm)→
    Link ID LID45 (data link down)→
        Server ID45 (server non-reachable)
SF d.c. #12 (data center fire alarm)→
    Link ID LID85 (data link down)→
        Server ID85 (server non-reachable)

Accordingly, next, once the final set of tuples families has been determined, all the tuple instances from both the stable samples for each tuple present in tuple family obtained as output from the step of determining tuple family consistency (step 329) are extracted, step 333, thus, creating consistent logical-tuple families, wherein a consistent logical-tuple family is a tuple family that results from the analysis in both of the data samples. The instance tuples are used to create physical instance families.

The tuple instances are then used to create tuple instance families, step 335. This is achieved by reference to the consistent logical-tuple families produced from comparing the logical-tuple families corresponding to each of the two stable data samples 21, 22 and analyzing occurrence of child instance tuples with respect to all parent instance tuples across all time windows. For example, a child equipment alarm instance tuple may be analyzed with respect to two fire-alarm instance tuples across all the time windows and the parent alarm with the greatest co-occurrence probability is associated with the child instance equipment alarm instance tuple. If both have the same co-occurrence probability, the parent tuple instance with the higher temporal probability is associated with the child-instance equipment alarm instance tuple.

To performing instance extraction, step 333, and determination of physical instance families, step 335, the following steps are carried out:

For the consistent tuple families, each tuple has a set of logical attributes. These logical attributes are used to extract instance time windows from original samples for each tuple in each consistent tuple family. In other words, for each tuple in a consistent tuple family, for each time window that there is at least one event that matches the tuple, read all the matching tuples from both stable samples.

The read events have both the logical attributes of the tuple and some physical attributes. Combined these become tuple instances.

The tuple instances are grouped based on the corresponding tuple families in the optimal co-occurrence matrix, i.e., from the optimal time interval obtained in Step 329.

The tuple instances are then used to generate instance tuple families, step 335, using the consistent tuple families as reference.

The result from the preceding steps is a number of instance tuple families.

Figure 10A:
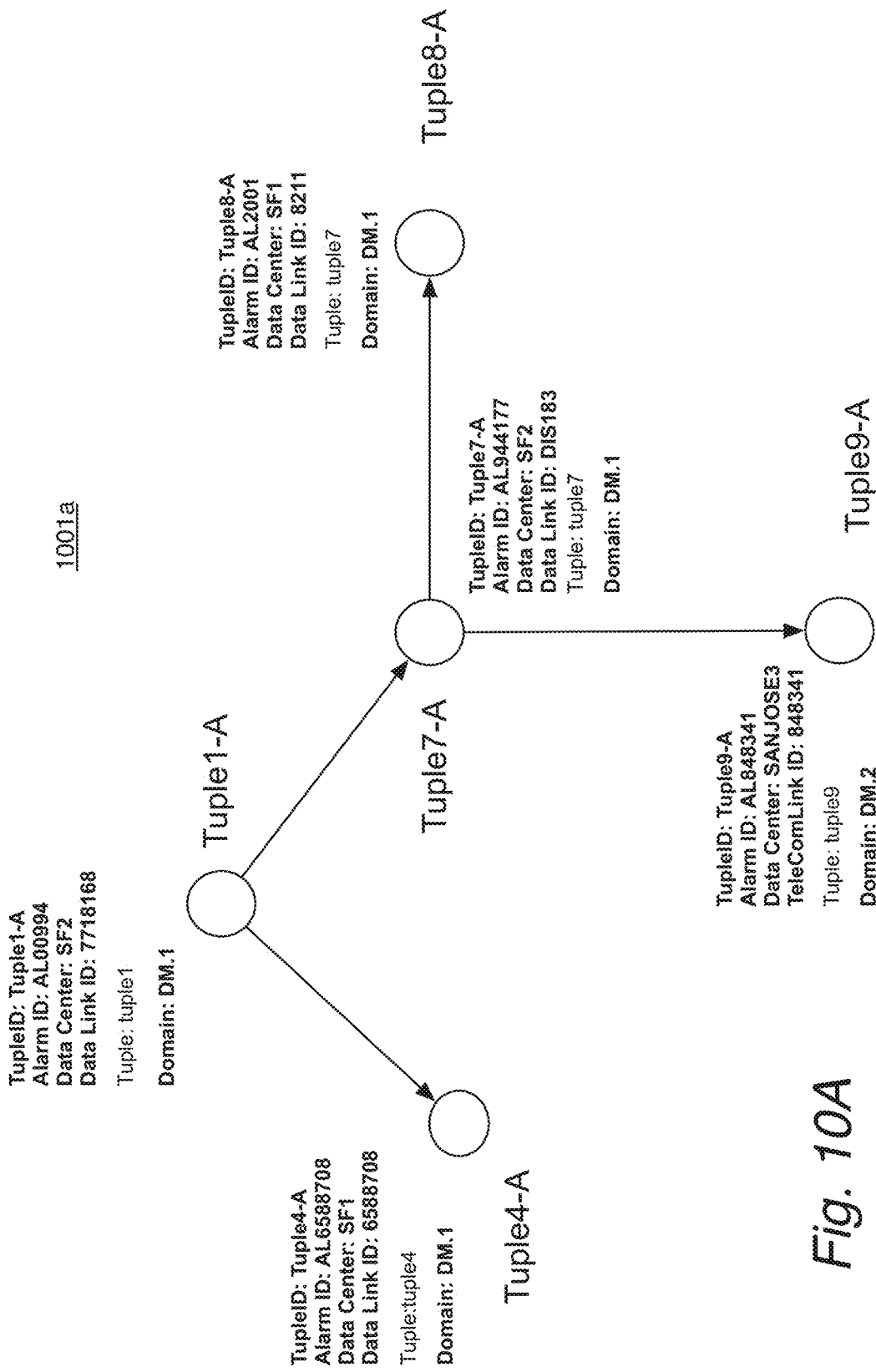
FIGS. 10a and 10b together illustrate two instance tuples families corresponding to the logical-tuple family of FIG. 8.
Figure 10B:
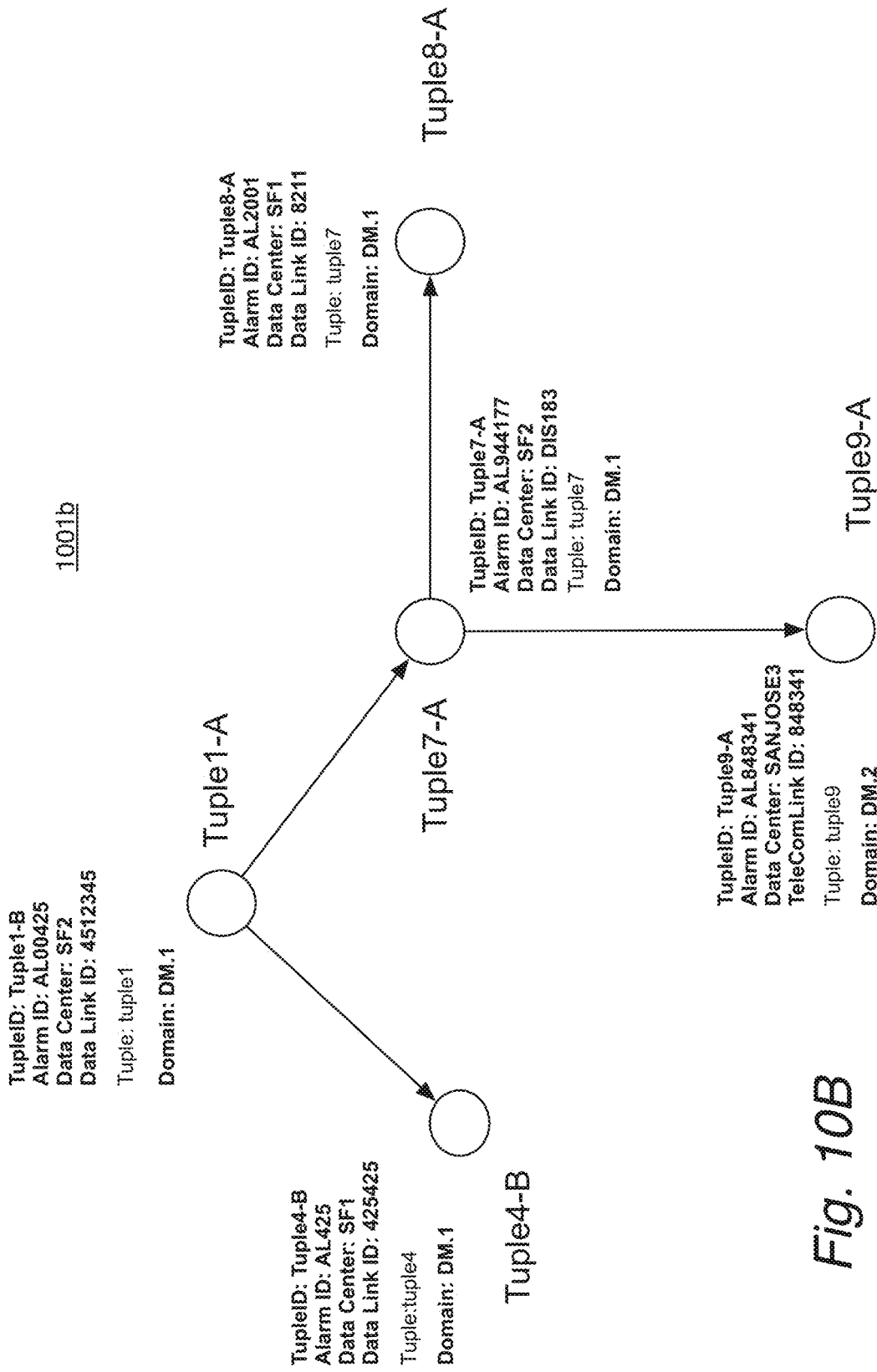

FIGS. 10A and 10B, are illustrations of two example instance-tuple families 1001a and 1001b corresponding to the logical-tuple family 801 of FIG. 8. The instance-tuple families 1001x contain the physical attributes (illustrated in bold font) associated with the tuple instances, i.e., particular alarms, data centers, communications links, etc.

The root nodes of the instance tuple families are the root issues that need to be addressed for alarm reduction or root issue identification. Thus, the parent tuple of each instance-tuple family, defined as the tuple that has at least one child and has no parent is presented to the network operator, for example, on the network operator console 201, together with the physical attributes of the events associated to each parent tuple.

The mechanism described above, for generating logical tuple families and therefrom instance tuple families, divides the data set into to two stable data samples. In alternative embodiments, the data set is divided into more than two stable data samples and the various steps that involve the two data samples are performed over all the data samples.

The mechanism, for generating logical tuple families and therefrom instance tuple families, is described hereinabove as a method involving several steps. In an embodiment, these steps are performed using a software pipeline wherein each of the steps is implemented as a module receiving input from the preceding module and producing output for the following module. For example, the step 321 of determining dependency graph structure may be a module that receives input from a co-occurrence binarized computation module, corresponding to step 319, and that produces output for a co-occurrence probability computation module, corresponding to step 323.

Tuples connected hierarchically within a family share a relationship provided by the pipeline algorithm. The parent tuple in each of the families is called "root issue" and is presented at the end of the method as the most important events to deal with. For example, in the example of FIG. 10, instance tuple Tuple1-A is the parent tuple of the illustrated instance-tuples family 1001a. It is a link failure indicated by Alarm AL00994 of a particular data link identified as Data Link ID 7718168 at the SF1 data center. Given that it is a root issue, the event associated with the tuple Tuple1-A is presented to the network operator.

Multiple events may correspond to a particular tuple. Each generate a tuple instance. Thus, if a second alarm has the same logical attributes as defined by tuple1, that second alarm also generates a tuple instance and depending on co-occurrence probabilistic score analysis, may also have its own instance family Such a situation is illustrated in FIG. 10, wherein tuple family 1001b of FIG. 10b has a parent node Tuple1-B that also is an instance of tuple1 just like parent node Tuple1-A of tuple family 1001a of FIG. 10a. A similar situation is illustrated with tuples 4-A and 4-B, respectively, wherein the former is a child instance of tuple1-A whereas the latter is an instance of tuple1-B. Conversely, in both instance tuple family 1001a and 1001b, tuple7-A is a child instance of both Tuple1-A and Tuple1-B. In other words, the occurrence of either alarm can co-occur with Tuple7-A.

The method described herein is advantageously implemented as a software program loaded on a computer and executable by the computer to achieve the results described herein. Such a software program may, for example, be loaded onto the network operator console 119.

Figure 11:
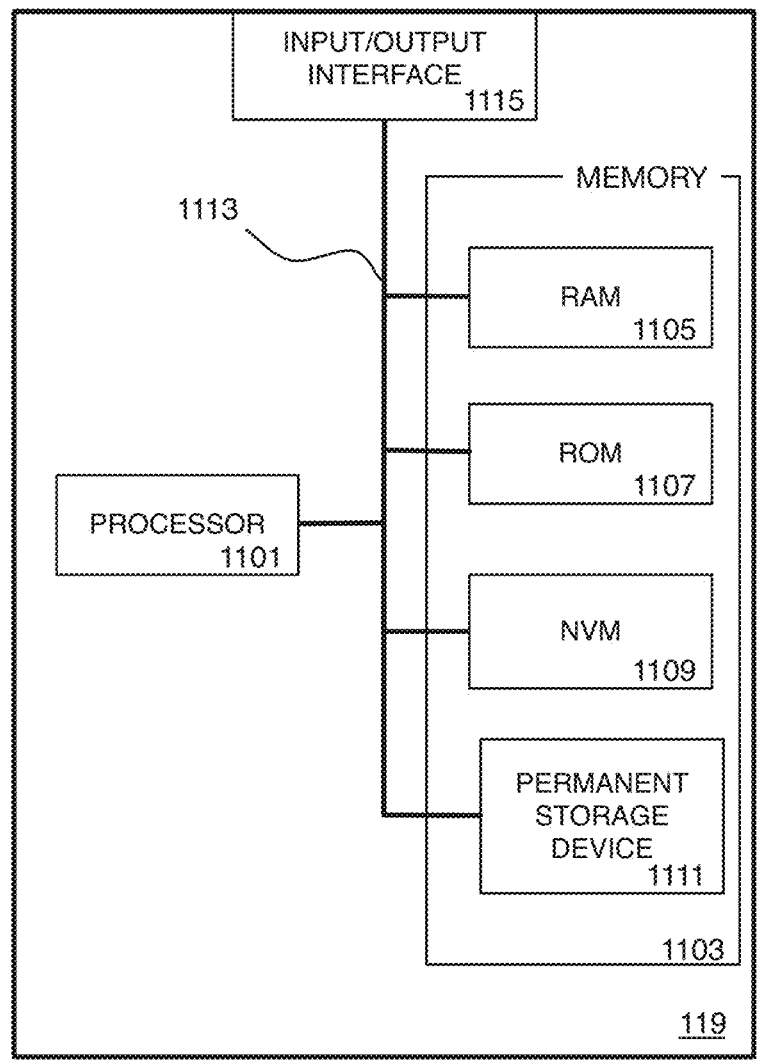
FIG. 11 is a high-level architecture illustrating a possible architecture for a computer on which a software implementation of the method of FIG. 3 may be installed.

FIG. 11 is a high-level architecture illustrating a possible architecture for a computer 119 on which a software implementation may be installed. The computer 119 contains a processor 1101 and a memory structure 1103, which stores data and programs executable by the processor 1101. The memory structure 1103 may contain one or more of each of a random-access memory (RAM) 1105, a read-only memory (ROM) 1107, a non-volatile programmable memory (NVM) 1109, and a permanent storage device 1111. The memory devices 1105, 1107, and 1109 are connected to the processor 1101 via a bus 1113.

The computer 119 further contains an input/output interface 1115 for communicating to external devices, e.g., the displays 201 of the operator console 119. The processor input/output interface 1115 may further communicate with other nodes on the network 101.

Typically, for computers such as a network operator console, software programs would be stored on the permanent storage device 1111 for loading into the RAM 1105 for execution by the processor 1101. Accordingly, in an embodiment a pipeline structured program implementing the root issue analysis method described herein is stored on a permanent storage device 1111. Such a pipeline structured program, when executed by the processor 1101 would perform the steps of the method described herein.

The technology described herein significantly reduces the number of crucial events that a network operator must address at a given time. The technology provides the network operator console with a set of events which, being reduced in number, is far easier to handle than the original dataset.

In some embodiments, the step of presenting the parent tuples comprises presenting the instances associated to each parent tuple.

Whether an instance is associated with an issue is analyzed in a validation phase including mapping how many families are associated with issues etc.

In some embodiments, the step of presenting the parent tuples comprises conferring a severity index to each parent tuple of each family based on the probability score of the tuple family, so that the list of parent tuples is hierarchized.

The severity index is related, among others, with the number of tuples of the family. This severity classification can further be based on a severity index available in the original dataset of events.

The invention claimed is:

1. A method for managing a plurality of events, wherein each event comprises physical attributes and logical attributes, the method comprising the steps of:
creating tuples, wherein each tuple is an identifier for a set of logical attributes to events having all the same logical attributes;
providing a set of hierarchized relations between tuples, wherein combinations of two tuples form a pair of tuples, by means of an unsupervised machine learning pipeline algorithm, wherein parent-child relations are provided between tuples, by:
creating a plurality of binarized co-occurrence matrices, each co-occurrence matrix reflecting different time intervals, wherein each column corresponds with a tuple and each row corresponds with a time window, so each matrix entry at a tuple column and a time window row represents that at least one event corresponding to the tuple associated with the tuple column appears in each time window associated with the time window row;
successively applying a heuristic function to each matrix entry of said plurality of co-occurrence matrices to obtain a co-occurrence probabilistic score for each pair of tuples, wherein the probabilistic score indicates the probability that one tuple of the pair, referred to as child tuple, co-occurs with the other tuple of the pair, referred to as parent tuple; and using the probabilistic score of each pair of tuples to quantify the strength of the parent-child relations;

classifying the tuples in families, each family contains all the tuples related according to the parent-child relations provided by the unsupervised machine learning pipeline algorithm;

identifying the parent tuple of each family, defined as a tuple that has at least one child and has no parent;

extracting instance tuples associated with each tuple in each tuple family thereby creating instance families;

presenting the parent tuple instances of each instance family, together with the physical attributes of the events associated to each parent instance tuple each instance family.

2. The method according to claim 1, further comprising: dividing the events into at least two samples;

wherein in the step of creating the plurality of binarized co-occurrence matrices, for each of the at least two samples, each column corresponds to a tuple and each row corresponds to a time window, such that each matrix entry thereby corresponds to a tuple and a time window and indicates that at least one event of said each sample has the logical attributes corresponding to the tuple appears in the time window associated with the matrix entry;

applying the heuristic function to obtain a co-occurrence probabilistic score for each pair of tuples, wherein the probabilistic score is a function of the probability that one tuple of the pair, referred to as child tuple, co-occurs in the binarized co-occurrence matrix with the other tuple of the pair, referred to as parent tuple;

identifying common parent-child relations in the two samples; and using the identified common parent-child relations to provide a unified set of parent-child relations between tuples based on both at least two samples.

3. The method according to claim 2, wherein the method comprises, prior to the step of dividing the events into two samples, cleaning the tuples by deleting tuples that do not fulfill a plurality of minimum requirements.

4. The method according to claim 2, further comprises:
for each binarized co-occurrence matrix:
creating a graph of parent-child relations based on the results of the heuristic function; and
calculating a probability for each parent-child relation and marking as strong those parent-child relations that have a probability higher than a predetermined threshold.

5. The method according to claim 2, further comprising choosing a co-occurrence matrix based on having higher probabilistic scores for parent-child relations vis-a-vis other co-occurrence matrices and use the parent-child relations generated from an optimal co-occurrence matrix to provide the unified set of parent-child relations, wherein the optimal co-occurrence matrix is the co-occurrence matrix with the highest probabilistic scores.

6. The method according to claim 1, wherein the step of presenting the parent tuples comprises presenting instances associated to each parent tuple.

7. The method according to claim 1, wherein the step of presenting the parent tuples comprises conferring a severity index to each parent tuple of each family, so that the final list of parent tuples is hierarchized.

8. A network operator console with improved management of a plurality of events, wherein each event comprises physical attributes and logical attributes, the network operator console comprising:
a processor,
the processor connected to a network of having a plurality of sensors distributed throughout the network, wherein the sensors transmit events to the processor of the network console;

a program storage device for storing instructions executable by the processor, the program storage device storing instructions to cause the processor to:

receive the events from the sensors;

create tuples, wherein each tuple is an identifier for a set of logical attributes to events having all the same logical attributes;

generate a set of hierarchized relations between tuples, wherein combinations of two tuples form a pair of tuples by means of an unsupervised machine learning pipeline algorithm, wherein parent-child relations are provided between tuples, by:

creating a plurality of binarized co-occurrence matrices, each co-occurrence matrix reflecting different time intervals, wherein each column corresponds with a tuple and each row corresponds with a time window, so each matrix entry at a tuple column and a time-window row represents that at least one event corresponding to the tuple associated with the tuple column appears in each time window associated with the time window row;

successively applying a heuristic function to each matrix entry of said plurality of co-occurrence matrices to obtain a co-occurrence probabilistic score for each pair of tuples, wherein the probabilistic score indicates the probability that one tuple of the pair, referred to as child tuple, co-occurs with the other tuple of the pair, referred to as parent tuple; and using the probabilistic score of each pair of tuples to quantify the strength of the parent-child relations;

classify the tuples in families, each family contains all the tuples related according to the parent-child relations provided by the unsupervised machine learning pipeline algorithm;

identify the parent tuple of each family, defined as a tuple that has at least one child and has no parent;

extract instance tuples associated with each tuple in each tuple family thereby creating instance families;

present the parent tuple instances of each instance family, together with the physical attributes of the events associated to each parent instance tuple each instance family.

9. The network console according to claim 8, wherein the program storage further comprises instruction to cause the processor to:

divide the events into at least two samples;

wherein for the binarized co-occurrence matrices, for each of the at least two samples, each column corresponds to a tuple and each row corresponds to a time window, such that each matrix entry thereby corresponds to a tuple and a time window and indicates that at least one event of said each sample having the logical attributes corresponding to the tuple appears in the time window associated with the matrix entry;

apply the heuristic function to obtain a co-occurrence probabilistic score for each pair of tuples, wherein the probabilistic score indicates the probability that one tuple of the pair, referred to as child tuple, co-occurs in the binarized co-occurrence matrix with the other tuple of the pair, referred to as parent tuple;

identify common parent-child relations in the two samples; and use the identified common parent-child relations to provide a unified set of parent-child relations between tuples based on both at least two samples.

10. The network console according to claim 9, wherein the program storage further comprises instruction to cause the processor to, prior to dividing the events into two samples, clean the tuples by deleting tuples that do not fulfill a plurality of minimum requirements.

11. The network console according to claim 9, wherein the program storage further comprises instruction to cause the processor to:

for each binarized co-occurrence matrix:
create a graph of parent-child relations based on the results of the heuristic function; and
calculate a probability for each parent-child relation and marking as strong those parent-child relations that have a probability higher than a predetermined threshold.

12. The network console according to claim 9, wherein the program storage further comprises instruction to cause the processor to choose a co-occurrence matrix based on having higher probabilistic scores for parent-child relations vis-a-vis other co-occurrence matrices and use the parent-child relations generated from an optimal co-occurrence matrix to provide the unified set of parent-child relations, wherein the optimal co-occurrence matrix is the co-occurrence matrix with the highest probabilistic scores.

13. The network console according to claim 8, to present the parent tuples comprises to present instances associated to each parent tuple.

14. The network console according to claim 8, wherein to present the parent tuples comprises to confer a severity index to each parent tuple of each family, so that the final list of parent tuples is hierarchized.

* * * * *